United States Patent [19]

Allison

[11] 4,057,355

[45] Nov. 8, 1977

[54] FRANGIBLE TIE ROD END BEARING SEAT

[75] Inventor: William D. Allison, Grosse Pointe Farms, Mich.

[73] Assignee: Ford Motor Company, Dearborn, Mich.

[21] Appl. No.: 702,381

[22] Filed: July 2, 1976

Related U.S. Application Data

[62] Division of Ser. No. 593,810, July 7, 1975, Pat. No. 3,988,818.

[51] Int. Cl.² .............................................. F16D 9/00
[52] U.S. Cl. .......................................... 403/2; 308/72; 403/135
[58] Field of Search ................. 403/2, 122, 135, 140

[56] References Cited

U.S. PATENT DOCUMENTS

| 3,160,430 | 12/1964 | Gottschald | 403/140 |
|---|---|---|---|
| 3,243,212 | 3/1966 | May | 403/122 X |

Primary Examiner—Wayne L. Shedd
Attorney, Agent, or Firm—Clifford L. Sadler; Keith L. Zerschling

[57] ABSTRACT

A preloaded tie rod end assembly for a motor vehicle steering system and a method for making the assembly is disclosed. The tie rod end is made by positioning the ball of a ball stud against a pair of frangible bearings within the socket portion of a tie rod end housing. A plastically deformable element is also situated within the housing. A closure member for the housing exerts a force against the bearings during the assembly operation and causes each bearing to fracture into circumferentially spaced bearing pieces. After the tie rod end is assembled, an axial load is placed upon the ball stud which is transferred to the deformable element thereby causing it to deform. The element is deformed to the extent necessary to bring the frictional resistance to rotation of the ball stud about its own axis within a prescribed torque range.

1 Claim, 5 Drawing Figures

U.S. Patent  Nov. 8, 1977  4,057,355
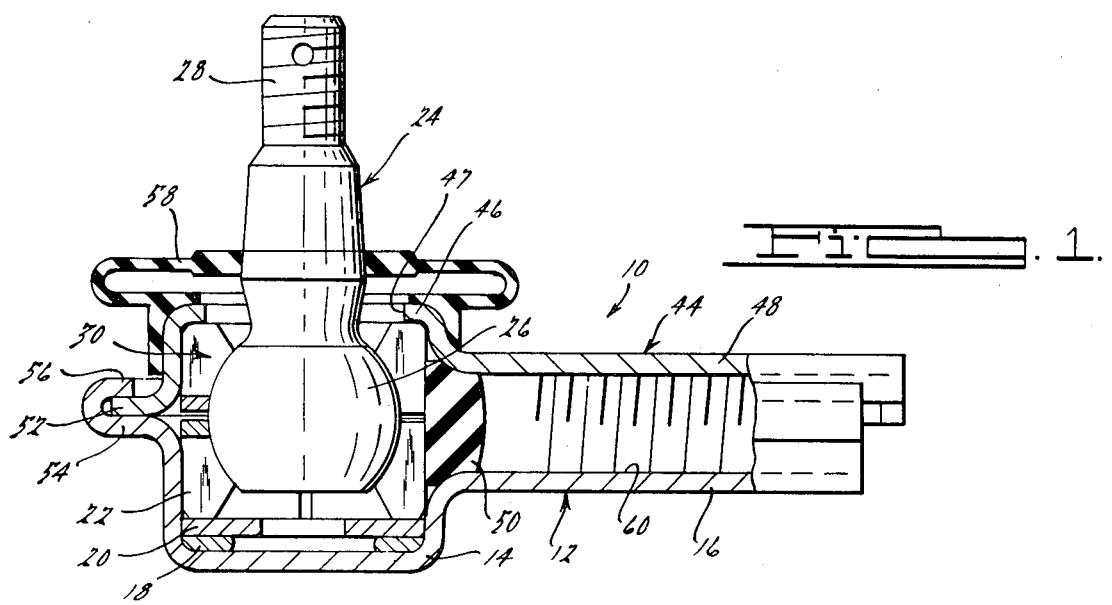
FIG. 1.
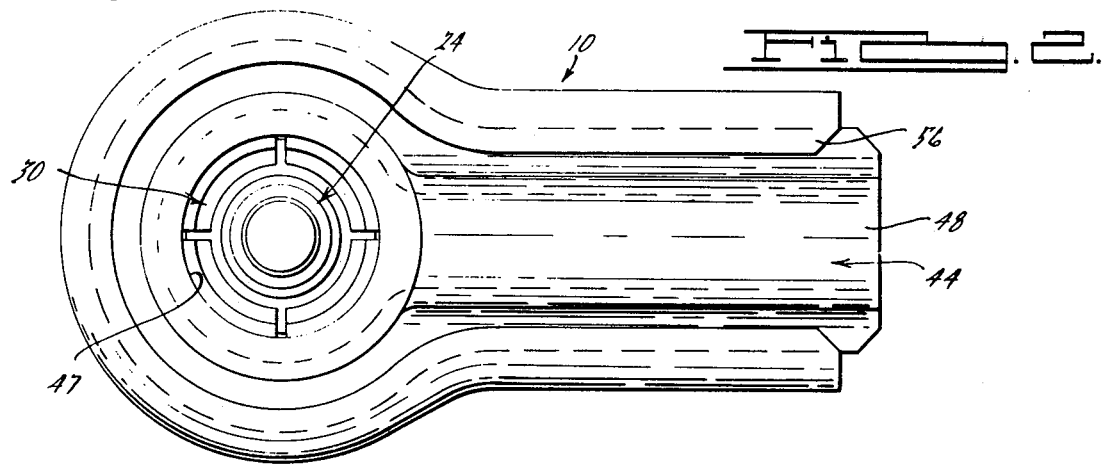
FIG. 2.
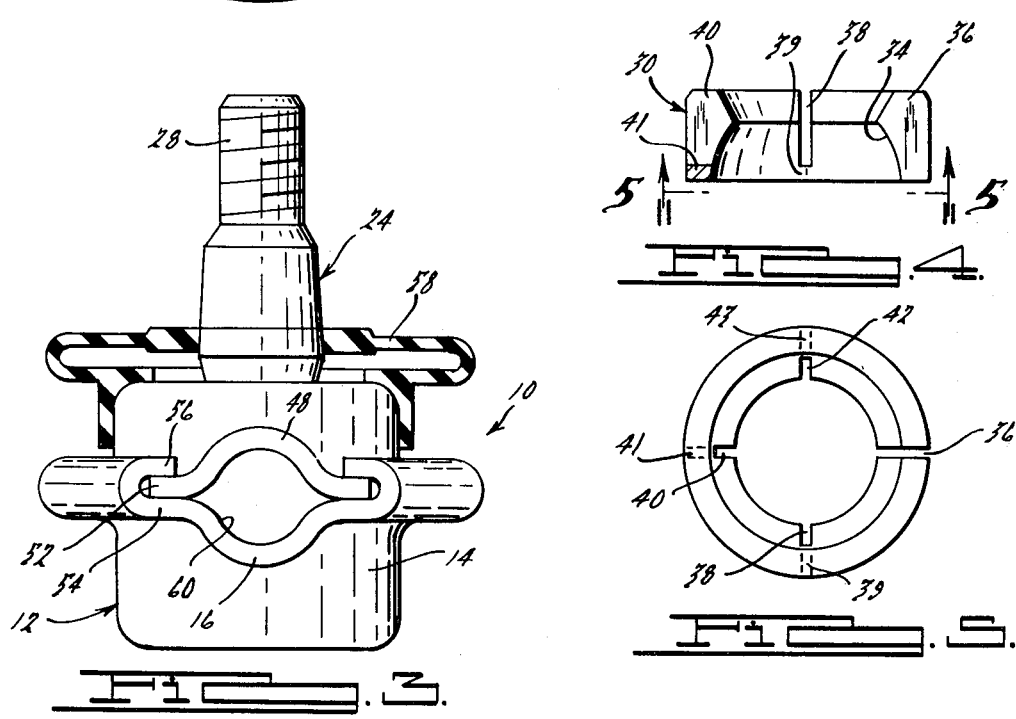
FIG. 3.
FIG. 4.
FIG. 5.

FRANGIBLE TIE ROD END BEARING SEAT

This is a division of application Ser. No. 593,810, filed July 7, 1975 now U.S. Pat. No. 3,988,818.

BACKGROUND OF THE DISCLOSURE

In order to provide a steering linkage system for a motor vehicle that operates in an optimum manner, it is necessary to have tie rod end assemlies with frictional resistance to joint movement that is within prescribed operating limits. Frictional resistance that is either above or below the desired range may exhibit undesirable effects. While the steering system will function for its intended purpose of transmitting a steering force from the steering wheel to the steerable road wheels, the vehicle operator may find that the steering does not have a desired precision "feel" or that excessive vibration and harshness may be transmitted from the road wheels through the linkage to the operator.

The present invention provides a tie rod end assembly for a motor vehicle steering linkage system that is characterized by its unique construction and method of manufacture which permits precise control of the preload of the joint while being relatively inexpensive to fabricate.

BRIEF SUMMARY OF THE DISCLOSURE

In the presently preferred form of a tie rod end assembly according to this invention, a housing has a socket portion and a stem portion. A plastically deformable lead washer is fitted in the socket portion. First and second annular frangible bearings are positioned in engagement with the ball of a ball stud and these three pieces are inserted into the socket. A closure member for the socket portion engages one of the bearings and while being secured to the housing during assembly exerts a load upon the bearings causing each to fracture into a plurality of circumferentially spaced apart bearing pieces.

At this point in the manufacturing operation, the joint has a preload that exceeds a predetermined desired amount. An axial force is then exerted on the ball stud causing the deformable element to plastically deform. This deformation relieves a portion of the preload of the joint. The element is deformed by an amount necessary to bring the frictional resistance to rotation of the ball stud within the desired predetermined torque range.

BRIEF DESCRIPTION OF THE DRAWINGS

The many objects and advantages of a preload tie rod end assembly that is made according to this invention will become apparent upon consideration of the following detailed discussion and the accompanying drawings, in which:

FIG. 1 is a side view in section of a new tie rod end construction;

FIG. 2 is a top plan view of a tie rod end of FIG. 1 with the rubber boot seal removed;

FIG. 3 is an elevational view of the stem end of the tie rod end;

FIG. 4 is a sectional view of one of the bearing means of the tie rod end; and

FIG. 5 is a bottom plan view of the bearing of FIG. 4 taken in the direction of arrows 5—5.

DETAILED DESCRIPTION OF THE PREFERRED EMBODIMENT

Referring now to the drawings, wherein the presently preferred embodiment of this invention is illustrated, FIG. 1 shows the construction of a tie rod end assembly 10. The tie rod end 10 has a housing 12 with a socket portion 14 and a stem portion 16. Positioned within the socket 14 is a plastically deformable lead washer 18 and a hard steel washer 20.

A generally annular bearing 22 formed of powdered bronze is positioned against the washer 20. A ball stud 24 has a ball 26 at its lower end positioned against the bearing 22. The shank 28 of the stud 24 extends upwardly from the socket 14. A second generally annular bearing 30 is positioned about the shank 28 and against the ball 26.

The bearings 22 and 30 are of identical construction. Referring to FIGS. 4 and 5, the configuration of the bearing 30 is shown prior to its installation into the socket 14. Bearing 30 is generally annular with a cylindrical outer surface 32 and a partially spherical inner bearing surface 34. The bearing 30 has a full slot 36 that extends completely through the bearing material. Three circumferentially spaced apart slots 38, 40 and 42 extend part way through the bearing 30 and divide it (in combination with the slot 36) into four bearing segments. Because the slots 38, 40 and 42 extend only part way through the bearing 30, tie bars 39, 41 and 43 remain which hold the four segments together.

The bearing 30 is molded of powdered bronze and is frangible. The tie bars 39, 41 and 43 holding the bearing segments together are easily fractured under load.

A closure member 44 having a socket closure portion 46 and a stem closure portion 48 is positioned over the housing 12. The socket closure portion 46 is in engagement with the upper bearing 30. The socket closure 46 has an opening 47 through which the shank 28 of the ball stud 24 extends. The stem closure portion 48 engages the stem portion 12 of the housing 10 whereby a hollow stem for attachment to a steering linkage element is formed. The inner end of the hollow stem is sealed by a rubber plug 50. The socket closure portion 46 of the closure member 44 has a central opening to accommodate the shank 28 of the ball stud 24. The socket closure portion 46 has an internal configuration to complement the socket 14 in order to retain the bearings 22, 30 and ball stud 24.

The periphery of the closure member 44 is provided with an outwardly extending flange 52 which overlays a peripheral flange 54 formed on the housing part 12. The closure member 44 and housing 12 are secured together by crimping over the edge 56 of the housing flange 54.

The tie rod end assembly 10 includes a boot type dust seal 58 which has a first portion in sealed engagement with the closure member 44 and a second portion that is in sealed engagement with the shank 28 of the ball stud 24. The boot seal 58 prevents the entry of contaminants into the interior of the assembly where they might abrade the bearing surfaces.

PREFERRED METHOD OF MANUFACTURE

The tie rod end assembly 10 is manufactured by first placing the lead washer 18 and steel washer 20 at the base of the socket portion 14. The rubber plug 50 is positioned at the inner end of the stem portion 16 of the housing part 12. The bearing 22 is placed on the steel washer 20 and lubricant is injected into the interior of the socket portion 14. The ball end 26 of the stud 24 is placed in engagement with the bearing 22 and the second bearing 30 is slipped over the shank 28 and into engagement with the ball end 26. The closure member 44 is located on the housing 12 and the flanged edge 56 of the housing 12 is crimped over to lock the closure member 44 in engagement with the housing 12. The securing of the closure member 44 to the housing part 12 will exert a load on the bearings 22 and 30 which will cause the tie bars connecting the bearing segments to fracture whereby the bearings 22 and 30 will each become circumferentially spaced apart bearing pieces.

The bearings 22 and 30 fracture into two circumferentially arranged series of bearing elements and these elements align themselves with respect to the socket 14, the closure member 44 and the ball 26. Due to this self-aligning feature, close tolerance control of these parts is not required.

The crimping of the edge 56, in addition to fracturing the bearings 22 and 30, will impose a preload that exceeds the amount desired for the finished joint. That is, the force required to overcome the frictional resistance to rotation of the stud 24 about its own axis or to pivot the stud about the center of the ball 26 will be greater than a predetermined amount.

In order to establish the desired preload, an axial force in the downward direction is exerted on the stud 24. The load exerted on the stud is sufficiently great to cause plastic deformation of the lead washer 18. The axial load is imposed in increments and the frictional resistance to rotation of the ball stud 24 is noted between each load increment. Plastic deformation of the washer 18 will relieve the preload of the joint and the axial force is applied to the extent necessary to bring the frictional resistance to rotation of the ball stud 24 into the desired torque range. For a typical vehicle application that range would be about 8 to 15 inch pounds.

The interior of the stem portion 16 and closure portion 48 is internally threaded as indicated by reference numeral 60 to accommodate attachment to a steering linkage element. It is also noted that the shank 28 of the stud 24 is constructed to be connected to another element of a steering linkage system. The assembly or manufacture of the tie rod end 10 is completed by placing the boot seal 58 in position.

SUMMARY

The tie rod end assembly of this invention is characterized by its simplicity of construction and ease of manufacture. The method by which the preload is established assures a finished joint having frictional resistance to movement within the desired specified range. In addition, the self-aligning feature of the frangible bearings permits the use of stamped socket and closure parts not requiring close tolerances.

The foregoing description presents the presently preferred embodiment of this invention. Modifications and alterations may occur to those skilled in the art that will come within the scope and spirit of the following claims.

I claim:

1. A bearing for a preloaded ball and socket joint having a generally annular shape with a partially spherical bearing surface,
    said bearing having a plurality of circumferentially spaced apart radial slots dividing said bearing into a plurality of bearing segments,
    frangible tie bars interconnecting said bearing segments,
    said tie bars having sufficient strength to maintain said bearing as a single piece during normal handling and being fracturable when assembled into said preloaded ball and socket joint whereby said bearing forms a plurality of separate bearing elements.